United States Patent [19]

Hopkinson

[11] 4,041,309
[45] Aug. 9, 1977

[54] BACKGROUND SUBTRACTION SYSTEM FOR PULSED NEUTRON LOGGING OF EARTH BOREHOLES

[75] Inventor: Eric C. Hopkinson, Houston, Tex.

[73] Assignee: Dresser Industries, Inc., Dallas, Tex.

[21] Appl. No.: 719,758

[22] Filed: Sept. 2, 1976

[51] Int. Cl.² .............................................. G01V 5/00
[52] U.S. Cl. ................................... 250/262; 250/269; 250/270
[58] Field of Search ........................ 250/262, 269, 270

[56] References Cited

U.S. PATENT DOCUMENTS

| 3,566,116 | 2/1971 | Nelligan | 250/269 X |
| 3,706,884 | 12/1972 | Youmans | 250/269 X |
| 4,002,903 | 1/1977 | Pitts, Jr. et al. | 250/262 X |

*Primary Examiner*—Archie R. Borchelt

*Attorney, Agent, or Firm*—William E. Johnson, Jr.

[57] ABSTRACT

Neutron generator in well logging instrument is pulsed 100 times having a time between pulses of 1400 microseconds. This is followed by an off period of four cycles wherein 2800 microseconds is allowed for capture radiation to decay to an insignificant level and the remaining 2800 microseconds is used to measure background radiation. This results in the neutron source being disabled four pulses after every hundred pulses of operation, or approximately a 4% loss of neutron output. A first detector gate is open from 400 to 680 microseconds and a second detector gate is open from 700 to 980 microseconds. During the 100 cycles, each of the gates is thus open for 280 microseconds times 100 for a total of 28,000 microseconds. By scaling the gate count rate by a factor of 10, the background is subtracted directly.

10 Claims, 9 Drawing Figures

BACKGROUND SUBTRACTION SYSTEM FOR PULSED NEUTRON LOGGING OF EARTH BOREHOLES

BACKGROUND OF THE INVENTION

This invention relates to the art of geophysical prospecting in general and to the art of radioactivity well logging in particular and more particularly to improvements in such logging wherein the lifetime of neutrons in the formation is measured.

Radioactivity well logging is conventionally of three sorts, natural gamma ray logging, gamma ray-gamma ray logging, and neutron logging. Neutron well logging is sometimes performed by traversing a well with a radium-beryllium source of energetic neutrons, thereby continuously irradiating the formations penetrated by the well with fast neutrons, and simultaneously measuring and recording the number of neutrons or gamma rays returning to the well from the formations as a result of such irradiation.

An improvement in neutron well logging as shown in the prior art utilizes a periodically varying neutron source whereby the neutron irradiation of the formations is periodically cut off. Such a source may comprise a system employing a material emitting alpha particles with a disk rotating beside it having alternate sectors made of material which emits neutrons when exposed to alpha particles. The disk is rotated to turn the neutron source off and on at an audio frequency. A continuously operating detector detects secondary radiation emitted from the formations as a result of the radiations, and the audio-frequency component in the detection signal is amplified and recorded to the exclusion of any constant detection signal related to the natural gamma radiation. In the instant invention, not only the neutron source but also the detecting system is periodically varied.

It is known in the prior art to irradiate the formations for a period of time sufficient to activate an appreciable number of nuclei of material in the formations, thereby rendering the material artificially radioactive, and at an interval of time following the cessation of irradiation to measure this artificial radioactivity. The time is related to the half life of the activated material and is of the order or minutes or seconds for such of the common elements of the earth as are activated appreciably by this means. This may be accomplished by causing the source to be turned on and off at a frequency related to half life and detecting continuously or the detector may follow a continuously emitting neutron source through the well at such spacing and rate as to cause the detector to arrive at a particular point in the well a predetermined interval after irradiation. In the instant invention, the period of the periodically varying source and detector system is related not to the half life of the irradiated material but to the lifetime of the neutrons in the formations, that is, to the time needed for fast neutrons emitted from the source to be slowed and captured. This time is of the order of hundreds of microseconds in ordinary earth formations.

In U.S. Pat. No. 3,379,882, assigned to the assignee of the present invention, there is described a system for radioactivity well logging wherein the formations are irradiated with neutrons from a periodically varying source operating at a repetition rate of the order of magnitude of hundreds or thousands of cycles per second, being thus alternately on and off for periods of hundreds of microseconds. A detecting system is synchronized with the source to operate while the source is off. The radiation detected may be either slow neutrons or gamma rays which result from thermal neutron capture; in either case the signal is related to the population of thermal neutrons in the formation, surrounding the borehole. From the time the source is turned off, the slow neutrons are gradually captured and the amount of radiation detected per unit time decreases until the source is again turned on. By measuring the number of thermal neutrons (or gamma rays produced by the thermal neutrons) present at any particular time, the rate of decay of the thermal neutron population may be measured. The rate of decay is dependent upon the nuclei of the material present in the formation and varies from formation to formation. This rate of decay is related to the time required for those nuclei to capture the thermal neutrons; therefore, in the system described therein, the measurement is related to this time and hence to the lifetime of the neutrons in the formations. The radioactivity well log which is normally conducted according to the radioactivity well logging system described in U.S. Pat. No. 3,379,882 comprises a pair of counting rate curves plus a curve indicative of the rate of decline of the neutron population which is a function of the ratio of the two counting rate curves. The curve is calibrated to record sigma, the thermal neutron capture cross section of the formation. The early gate, or $N_1$ curve can be derived during some interval, for example, 400 to 600 microseconds, or 400 to 680 microseconds after time zero as contemplated by the present invention; that is, it is a measure of the radiation intensity detected during the interval from 400 to 680 microseconds after the termination of the neutron pulse from the neutron source. The late gate, or $N_2$ curve, is a similar measurement derived during the interval from 700 to 980 microseconds after time zero. The present invention relates to an improvement upon the system as described in said patent.

Furthermore, in U.S. Pat. No. 3,706,884, also assigned to the assignee of the present invention, there is described a system for using three detection gates following each neutron pulse and associated circuits for substantially eliminating radiation background count in pulsed neutron well logging. Although the system described in U.S. Pat. No. 3,706,884 has worked with a high degree of success, there has sometimes been a problem when using the three gate system because of statistical inaccuracies arising due to the count rate of the signals being of the same order of magnitude.

Furthermore, in U.S. Pat. No. 3,566,116 to William B. Nelligan, especially with regard to FIG. 6 of that patent, means are provided for pulsing the neutron generator three times followed by the omission of a single neutron pulse in an attempt to measure the background radiation. However, this particular system, by skipping every forth neutron pulse, does not recognize the problem associated with disabling the pulse generator so often with its concomitant loss of neutrons. Furthermore, with such a system, the pulse generator is not likely to be disabled for a period sufficient to allow all the background radiation to die away.

It is therefore the primary object of the present invention to provide an improved method and apparatus for determining geophysical characteristics of formations about a borehole;

It is still another object of the invention to provide means for computing and/or eliminating the effect on the counting rated due to background radiation within the borehole.

The objects of the invention are accomplished, generally, by means for pulsing a neutron generator for a considerable number of times and for allowing the generator to be off for a small percentage of time compared to the number of times the generator is pulsed in order to measure the background radiation while having no substantial effect on the number of neutrons generated.

These and other objects, features and advantages of the present invention will be more readily appreciated from the following detailed description, when considered with the accompanying drawings, in which:

Figure 1:
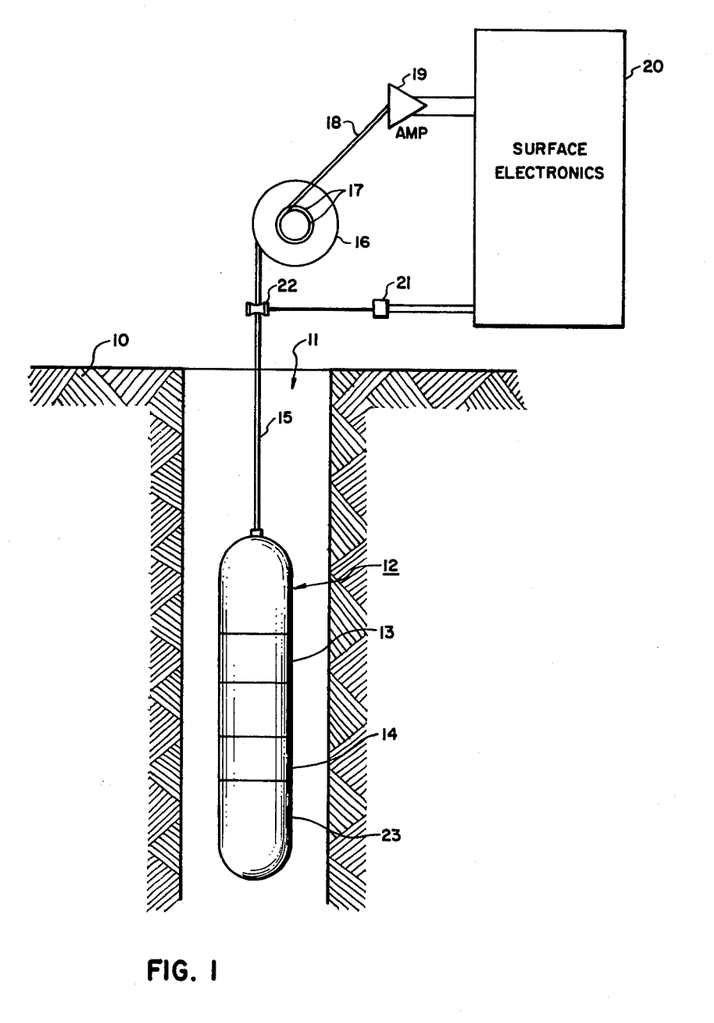
FIG. 1 is a side elevational view partly in cross section, illustrating apparatus according to the invention, and the disposition of such apparatus relative to the strata to be examined.

Referring now to the drawings in detail, particularly to FIG. 1, there is illustrated schematically a radioactive well surveying operation in which a portion of the earth's surface 10 is shown in vertical section. A well 11 penetrates the earth's surface and may or may not be cased. Disposed within the well is subsurface instrument 12 of the well logging system. Subsurface instrument 12 comprises a detecting system 13 and a neutron source 14. Cable 15 suspends the instruments in the well and contains the required conductors for electrically connecting the instrument with the surface apparatus. The cable is wound on, or unwound from, drum 16 in raising and lowering the instrument 12 to traverse the well.

In making a radioactivity log of a well, instrument 12 is caused to traverse the well. During the traversal, neutrons from source 14 irradiate the formations surrounding the borehole, and radiations influenced by the formations are detected by detecting system 13. The resultant signal is sent to the surface through cable 15. Through slip rings and brushes 17 on the end of the drum 16, the signals are conducted by lines 18 to the amplifier 19 for amplification. The amplified signal is conducted to the surface electrons 20. A recorder, for example, recorder 70 of FIG. 5, within the electronics section 20 is driven through a transmission 21 by measuring reel 22, over which cable 15 is drawn, so that the recorder 70 moves in correlation with depth as instrument 12 traverses the well. Amplifier 19 may be included in the subsurface instrument, or amplification may be effected both on the surface and in the subsurface instrument. It is also to be understood that the instrument housing 23 is constructed to withstand the pressures and mechanical and thermal abuses encountered in logging a deep well.

As is well known in the art of radioactivity well logging, the formation 10 is irradiated by neutrons from the neutron source 14, for example, a D-T accelerator. These neutrons participate in elastic collisions with the atoms contained in the various layers of the formation. The secondary radiation resulting from bombardment by the primary radiation in the form of neutrons from the source 14 is detected by the radiation detector 13.

The measurement of the decline of the thermal neutron population provides a means for determining a property of the material surrounding the borehole which is a definite, calculable, physical parameter, the macroscopic capture cross section of the formation.

A simple relationship exists between the measured "lifetime" of a formation and its chemical composition. To derive this relation, it is first necessary to define neutron lifetime. For this purpose, it is defined as L, the time required in a given medium for the total number of thermal neutrons existing at any instant to fall to half value. Thus, L is a quantity which is analogous to the half life of radioactive materials.

Just as with radioactive decay, the number of neutrons captured per unit time is proportional to the number of neutrons present. The total number of neutrons in the formation as a function of time can be generally expressed by a formula as follows:

$$n = n_o e^{-\Sigma VT} \quad (1)$$

Where $n$ is the number of neutrons at any time $T$, $n_o$ is the number of neutrons at time $T = 0$; $V$ is the velocity of thermal neutrons, being a constant, and $\Sigma$ is the macroscopic thermal neutron capture cross section. $\Sigma$ differs for different formation materials, and can easily be calculated if the chemical composition is known.

Figure 2:
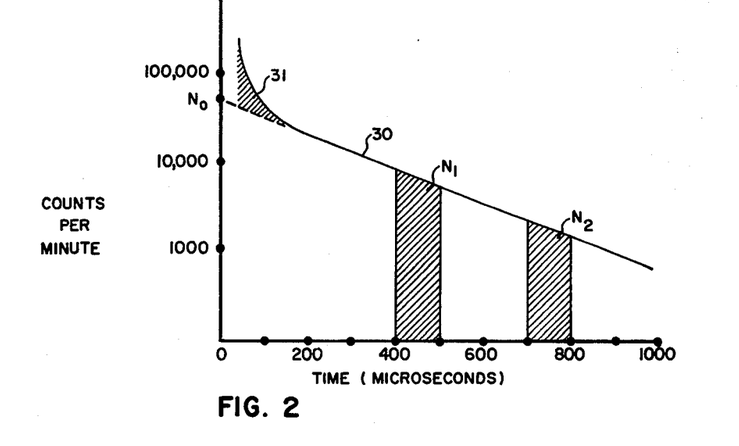
FIG. 2 is a schematic representation of a characteristic of decay of the thermal neutron population following a burst of fast neutrons within a well.

In order to make a quantitative measurement of an unknown formation fluid in a logging operation, the slope of the radiation decay curve, for example, curve 30 in FIG. 2, must be determined. To do this, the logging instrument is arranged so that two separate measurements are made during each cycle, the first at a time $T_1$ after the neutron source pulse and the second at a later time, $T_2$.

At times $T_1$ and $T_2$, the counting rates $N_1$ and $N_2$, respectively, are given by the following relation derived from equation 1:

$$ln(N_2|N_1) = -\Sigma V(T_2 - T_1)$$

If we take $T_2 - T_1$ equal to 600 microseconds, for example, then $$ln(N_2|N_1) = -132\Sigma$$
$$(N_2|N_1) = e - 132\Sigma$$

so in the case of salt waters and where $\Sigma$ is computed to be 0.0269, $$(N_2|N_1) = e^{-3.55} = 0.029$$

but for the fresh water sand where $\Sigma = 0.0099$, $$(N_2|N_1) = e^{-1.29} = 0.275$$

In logging, the observed deflections of the two recorded curves are proportional to $N_1$ and $N_2$, respectively. If desired, the two curves may be nomalized so that they produce equal log deflections in a fresh water sand. In the example given, it can be seen that the salt water sand would not produce equal deflections but two deflections differing by a factor $(0.275/0.029) = 9.5$. In other words, when logging through these two formations, the log response could be set up in one zone so as to give the same deflections for both curves, whereupon in the other zone, the two deflections would differ by 950 percent. An even bigger differential would result if the interval $T_2 - T_1$ were chosen larger, for example 900 microseconds, in which case the two curves would differ in the relative response to the particular zones per factor of 2,900 percent.

The technique described of comparing the relative counting rates in two separate gates during the quiescent period between pulses has been found to be a generally satisfactory means for a quantitive evaluation of the decline of the thermal neutron population. Depending on lithologic conditions, the duration and timing of the gates may be chosen in various ways to achieve the desired result.

FIG. 2 illustrates a counting rate curve 30 which is exemplary of the decline of the thermal neutron population following each neutron source pulse. The region 31 of the curve is influenced by the borehole and the fluids, casing, and other materials therein which generally result in a more rapid capture of the neutrons in the borehole than of those in the formation surrounding the borehole. For this reason region 31 of the decline curve is not accurately representative of the formation characteristics. Accordingly, no measurement is made during this time interval. In the case of most potentially productive reservoir rocks, the region 31 does not extend into the interval $N_1$ and therefore the measurement of $N_1$ and $N_2$ provides a means for determining the characteristics of the formation without influence due to the presence of the borehole. The counting rates $N_1$ and $N_2$ are taken, respectively, during the periods of 400–500 and 700–800 microseconds after each neutron pulse. However, such times are merely illustrative of providing two gated detection intervals during the decline of the thermal neutron population.

Figure 3:
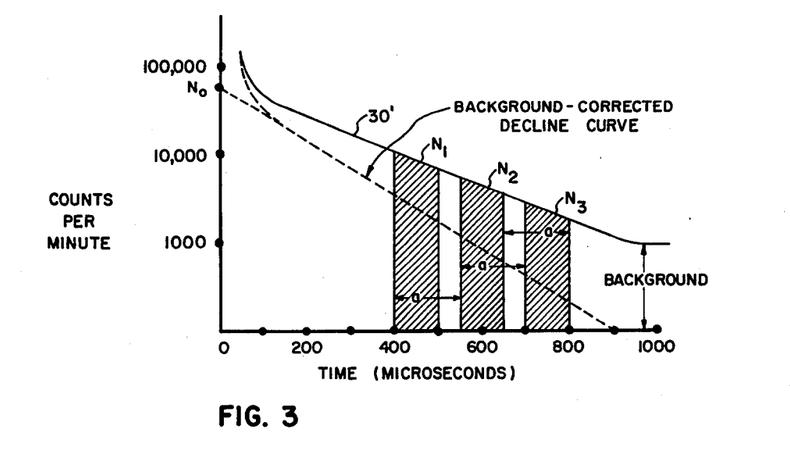
FIG. 3 is a schematic representation of three gated intervals in accordance with the prior art within the thermal neutron decay curve.

FIG. 3 illustrates the curve 30′, similar to curve 30 in FIG. 2, but having three gated detection intervals with respective counting rates $N_1$, $N_2$ and $N_3$. Such a curve is exemplary of the prior art shown in the aforementioned U.S. Pat. No. 3,706,884. FIG. 3 depicts the observed effect when a "background" is present. This background may, for example, be due to the detection of gamma rays resulting from $N^{16}$ induced in the rocks and borehole fluids by interaction with neutrons from the source. Since $N^{16}$ is a radioactive isotope with a half life of 7.3 seconds, it is present in substantially equal abundance throughout the measurement cycle and as such constitutes an effectively constant background. Similarly, artificial radioactivity may be induced in the scintillation crystal itself or in other elements of the borehole or formations. When the radiation detector responds to these radiations, either by design or inadvertently, the observed slope of the decay curve 30′ of FIG. 3 is different from the true slope which would be observed in the absence of such background.

Figure 4:
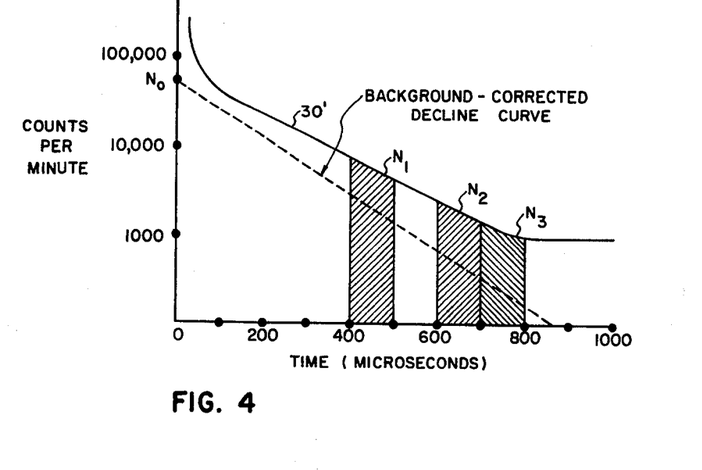
FIG. 4 is a schematic representation of an alternative embodiment of the prior art wherein two of the three intervals as illustrated in FIG. 3 are contiguous.

FIG. 4 illustrates a curve 30′, as in FIG. 3, but having contiguous detection intervals for the counting rates $N_2$ and $N_3$, as is also shown in U.S. Pat. No. 3,706,884.

Figure 5:
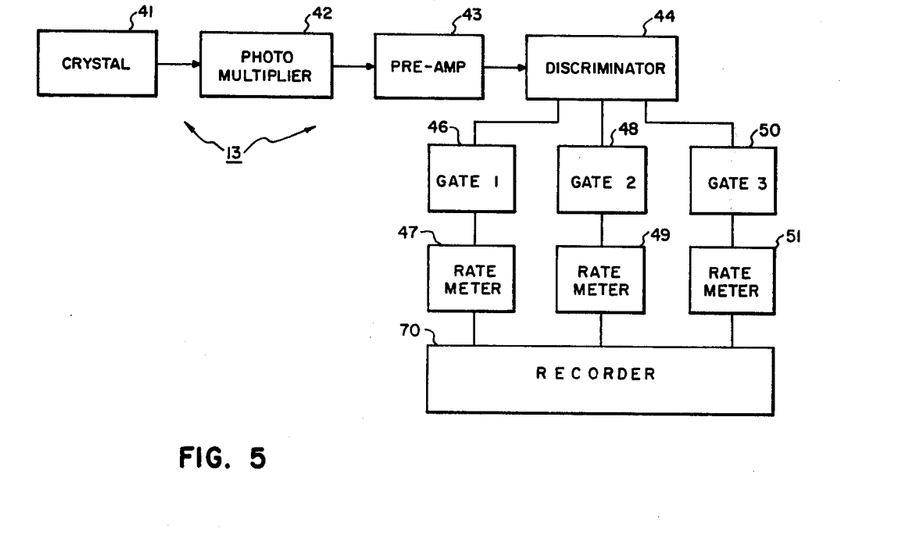
FIG. 5 is a block diagram illustrating the prior art apparatus for providing three gated detection intervals following each neutron pulse.

FIG. 5 illustrates the radiation detection system 13 in block diagram. This prior art circuitry is also shown in the aforementioned U.S. Pat. No. 3,706,884. A crystal 41, for example CsI or NaI, can be used as a scintillation crystal. LiI, a neutron detector, is also acceptable. For purposes of this apparatus and circuitry, however, it is desirable that the crystal used have an output proportional to the energy of a gamma ray photon received. A crystal of this type emits a photon of light energy when a gamma ray photon impinges upon it, and the energy of the light photon is proportional to the energy of the incoming gamma ray photon.

The scintillation from the crystal 41 is coupled to the photomultiplier tube 42 which produces electrical pulses proportional to the intensity of the light produced by the crystal. The crystal 41 and photomultiplier 42 can be fabricated, if desired, according to U.S. Pat. No. 3,254,217 to Arthur H. Youmans. These pass to the pre-amplifier conventional stage 43. The preamplifier 43 is connected to the discriminator 44 which is set to respond to pulses of a preselected magnitude. It should be appreciated that the discriminator 44 can be built in accordance with FIG. 4.1, page 204 of *Electronics, Experimental Techniques*, Elmore and Sands, published by the McGraw Hill Book Company, Inc. in 1949.

The gates 46, 48 and 50, respectively, for example, built in accordance with gating circuitry such as is depicted in U.S. Pat. No. 3,358,142 to Eric C. Hopkinson et al., connect the discriminator 44 outputs to conventional counting rate meters 47, 49 and 51, the outputs of which may be connected to a recorder 70. If desired, the counting rate meters 47, 49 and 51 can be constructed in accordance with FIG. 3 of U.S. Pat. No. 3,538,329 to Francis J. Niven, Jr. The recorder 70 is conventional, for example, a film strip recorder. Gates 1, 2 and 3 (elements 46, 48 and 50) are synchronously driven by signals from the neutron source 14 to provide predetermined gating intervals, for example, like those illustrated in FIGS. 3 and 4.

If desired, one of the gates, for example, gate 2, could have a time duration twice that of gate 1, and thus produce contigous regions such as $N_2$ and $N_3$ of FIG. 4 without the provision of a third gate per se.

From the basic equation, above discussed, $$N = N_o e^{-\Sigma vT} \tag{1}$$

it can be shown that the counting rates for gates 1, 2 and 3 are given by $$N_1 = \frac{KN_o}{\Sigma} e^{-\Sigma v t_{11}}[1 - e^{-\Sigma v g}] + Bg \tag{2}$$

$$N_2 = \frac{KN_o}{\Sigma} e^{-\Sigma v t_{21}}[1 - e^{-\Sigma v g}] + Bg \tag{3}$$

$$N_3 = \frac{KN_o}{\Sigma} e^{-\Sigma v t_{31}}[1 - e^{-\Sigma v g}] + Bg \tag{4}$$

where $K$ is a constant, $g$ is the gate width, $B$ is the background counting rate, and $T_{11}$, $T_{21}$ and $T_{31}$ are the respective beginning times of the three gates.

From equations 2, 3 and 4, providing $g$ is constant, $$\Sigma = \frac{1}{V_A} \cdot \ln \frac{N_1 - N_2}{N_2 - N_3} \tag{5}$$

where $a$ is the gate spacing as shown in FIG. 3.

However, as previously discussed, and referring specifically to equation (5), statistical errors can be introduced because of the problems inherent in substracting $N_2$ from $B_1$ and $N_3$ from $N_2$ when such numbers are sometimes nearly identical.

Figure 6:
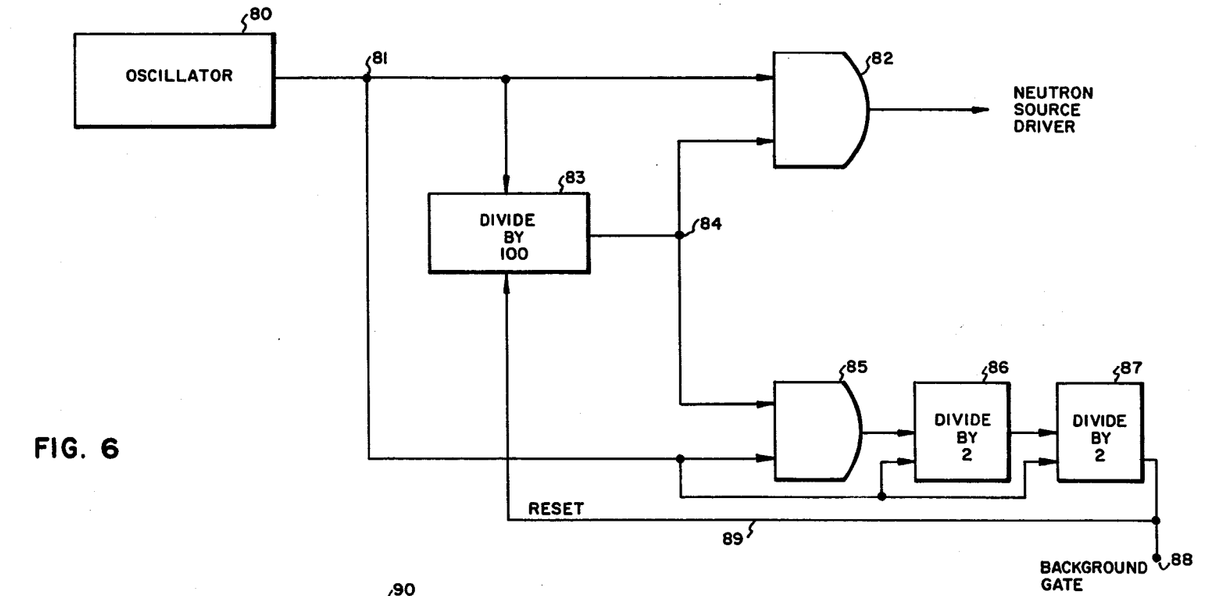
FIG. 6 is a block diagram illustrating subsurface apparatus according to the present invention for deriving the background radiation count.

Referring now to FIG. 6, there is shown in block diagram some of the circuitry according to the present invention used in the subsurface instrument 12 illustrated in FIG. 1. An oscillator 80, which is set to deliver pulses 90 (shown in FIG. 7) every 1400 microseconds, has its output connected to a junction 81 which in turn is connected to one of the inputs of an INHIBIT gate 82 and one of the inputs of a divide-by-100 circuit 83. The output of the divide-by-100 circuit 83 is coupled into junction 84 which in turn is connected to the other input of the INHIBIT gate 82. The junction 81 is also connected into the input of the AND gate 85 which has its other input connected to the terminal 84. The output of the gate 85 is connected to the input of a divide-by-2 circuit 86. The output of the divide-by-2 circuit has its output connected to the input of another divide-by-2 circuit 87 whose output is connected to terminal 88. Each of the divide-by-2 circuits 86 and 87 have additional inputs from the junction 81 representing the output of the oscillator 80. The junction 88, which is identified as being indicative of the background gate, is also coupled by the conductor 89, labeled as RESET, back to the divide-by-100 circuit 83.

Figure 7:
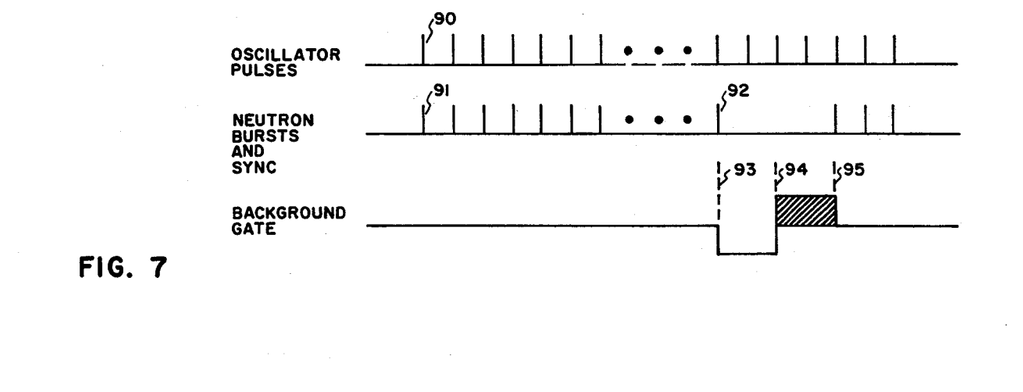
FIG. 7 schematically illustrates waveforms within the circuitry of FIG. 6.

In the operation of the circuitry of FIG. 6, and in conjunction with the representative waveforms illustrated in FIG. 7, it should be appreciated that the oscillator produces pulses at a repetition rate of once every 1400 microseconds. These are coupled into the INHIBIT gate 82 whose output is connected to the neutron source driver. As is well known in the art, the neutron source driver causes the neutron source to be pulsed each time the gate 82 produces a pulse. Once the divide-by-100 circuit has received 100 pulses from the oscillator 80, it produces an inhibit pulse at the junction 84 which in turn causes the gate 82 to no longer produce output pulses as long as there is a signal on the junction 84. Thus, looking at FIG. 7, neutron burst and sync pulses 91 are being produced for each oscillator pulse 90 until the 100th pulse is produced, shown as being pulse 92 in the waveform shown in FIG. 7. As is illustrated, there is no neutron burst subsequent to the pulse 92 during four consecutive cycles of the oscillator 80, thus representing a time span of 5600 microseconds.

Coincident with the generation of the inhibit pulse on junction 84 and being coupled into the INHIBIT gate 82, this pulse is coupled into the AND gate 85 which, together with the oscillator pulses from junction 81, causes pulses to be generated by the AND gate 85 every 1400 microseconds. These are coupled into the divide-by-2 circuit 86 such that its output produces pulses every 2800 microseconds. These pulses are coupled into the divide-by-2 circuit 87 which thus produces pulses every 5600 microseconds. After 5600 microseconds, the divide-by-2 circuit 87 couples a pulse along the reset line 89 to the divide-by-100 circuit to reset that circuit and cut off the inhibit pulse being generated at junction 84. This causes the complete circuitry of FIG. 6 to recycle. The divide-by-2 circuits 86 and 87 are biased such that the time between the lines 93 and 94 produces a negative pulse of 2800 microseconds and a positive pulse between the lines 94 and 95 of 2800 microseconds. Thus, the are identified by the cross-hatching between the lines 94 and 95 is indicative of the time during which the background gate signal is generated at the junction 88.

Figure 8:
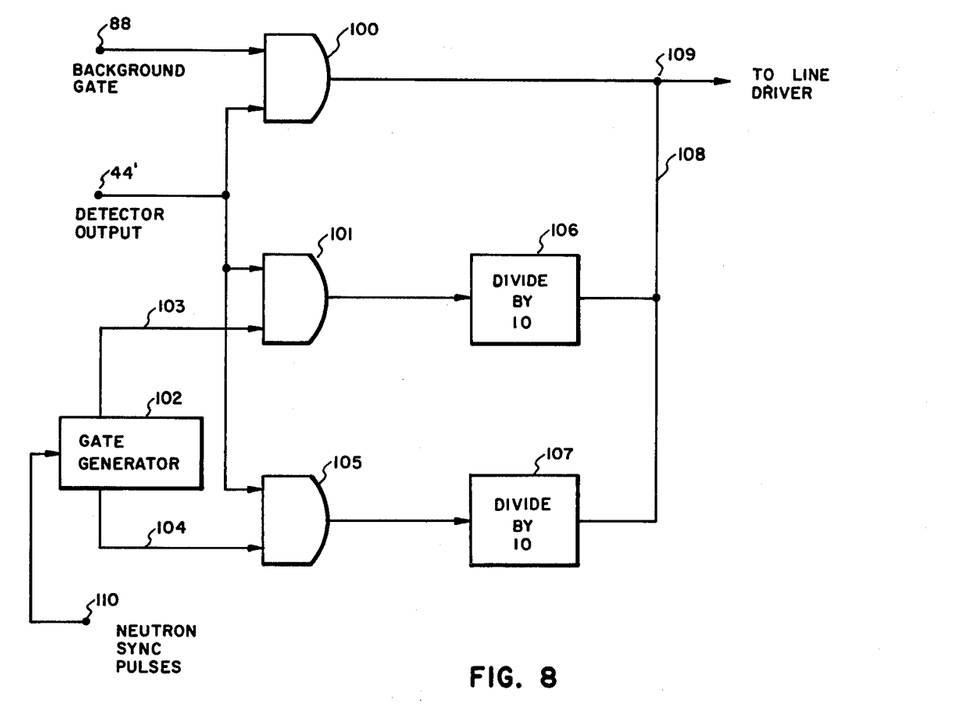
FIG. 8 is a block diagram showing additional circuitry within the subsurface instrument for deriving the background radiation count and the counts from the neutron detectors during the first and second gate following each neutron burst.

Referring now to FIG. 8, there is additional circuitry within the logging instrument illustrated for utilizing the background gate generated in FIG. 6. The junction 88 is coupled into the input of the AND gate 100 which has another input from the discriminator 44', labeled as being the detector output. The detector output is also connected into the first inputs of the AND gates 101 and 105. The second inputs of the AND gates 101 and 105 are coupled out of the gate generator 102 by means of conductors 103 and 104, respectively. The gate generator 102 is triggered by the neutron sync pulses occurring on junction 110 which coincides with the neutron burst and sync pulses 91 illustrated in FIG. 7. The output of the gate 100 is coupled into junction 109. The output of gate 101 is coupled into a divide-by-10 circuit 106 whose output is connected to the junction 109 by conductor 108. The output of gate 105 is coupled into a divide-by-10 circuit 107 whose output is also connected by means of conductor 108 to the junction 109.

The junction 109 is coupled to a line driver (not illustrated) for causing the signals in the subsurface unit to travel over the cable 15 in FIG. 1 to the earth's surface as is conventional in the art.

In the operation of the circuitry of FIG. 8, taken in conjunction with the circuitry of FIG. 6, it should be appreciated that the gate generator 102 is set to be triggered by the neutron sync pulses occurring at junction 110 and to generate a gating pulse on the conductor 103 having a width of 400 to 680 microseconds and to generate a gating pulse on conductor 104 having a width of 700 to 980 microseconds following the neutron sync pulse. Thus, any electrical signals indicative of detected radiation appearing at the junction 44' will be passed through the gate 101 during the interval of 400 to 680 microseconds and the pulses appearing on the terminal 44' will be passed through the gate 105 between the interval of 700 to 980 microseconds. The number of electrical pulses appearing at both the gates 101 and 105 are scaled down by the divide-by-10 circuits and are passed along the conductor 108 to the junction 109 and then on to the line driver.

In a similar manner, any electrical signals indicative of the measured background radiation during the last 2800 microseconds following the 100th neutron burst will be passed through the AND gate 100 to the line driver for transmission to the earth's surface.

Figure 9:
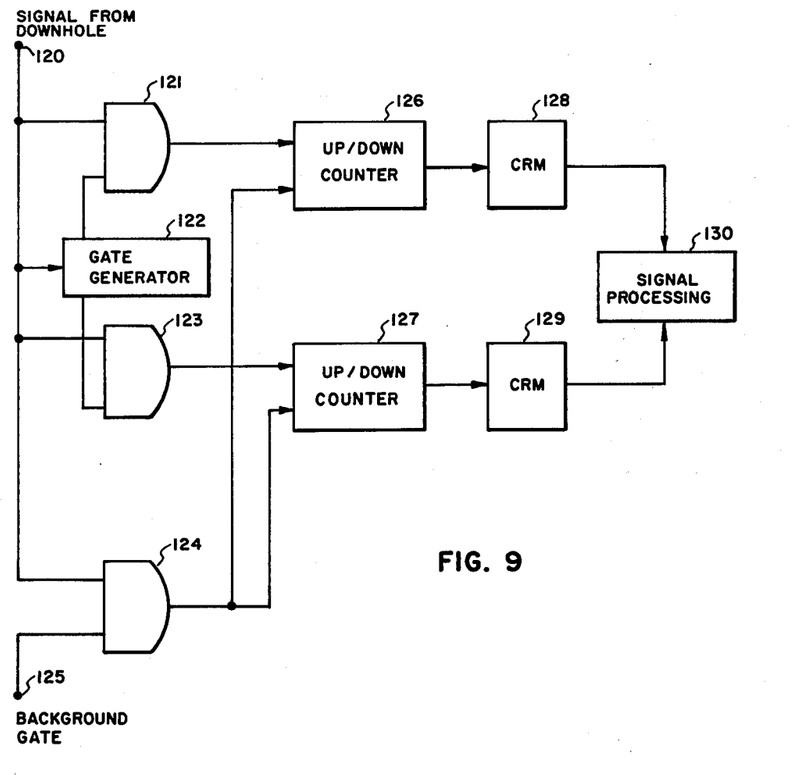
FIG. 9 is a block diagram illustrating circuitry for processing the signals at the surface from the downhole instrument which is used for offsetting the background radiation while processing the signals acquired during the first and second gate intervals.

Referring now to FIG. 9, after the signals from the line driver have passed up the cable to the earth's surface, they appear at junction 120, labeled as being the "Signal From Downhole." The signal from downhole includes the neutron sync pulses, the background pulses and the pulses detected during the first and second gates following each neutron burst. The gate generator 122 is set to be triggered by the neutron sync pulses and to gate the electrical pulses out of gate 121 during the interval of 400 to 680 microseconds after the sync pulse and to produce the detected pulses out of the gate 123 during the intervals of 700 to 980 microseconds. The output of the gate 121 is coupled into an up/down counter 126 and the output of the gate 123 is coupled into an up/down counter 127. The junction 125, labeled as "background gate" has produced thereon a signal of 2800 microseconds in duration produced just as is the 2800 microsecond background gate between the points 94 and 95 in FIG. 7. This signal is produced in response to 100 neutron sync pulses being generated just as was down in the circuitry of FIG. 6. Thus, when the detector pulses are passed from the junction 120 into the gate 124, those pulses appearing at the output of gate 124 occur only during the generated background gate at the surface and are coupled into the up/down counter 126 and the up/down counter 127. The output of the counter 126 is coupled into a count rate meter 128 whose output passes into a signal processing circuit 130. Likewise, the output of the up/down counter 127 is coupled into the count rate meter 129 whose output is coupled into the signal processing circuitry 130.

In the operation of the circuitry of FIG. 9, assume first that the background radiation pulses from the gate 124 are being coupled into the two up/down counters. Assuming that the pulses from the background gate cause each of the counters to count down, these pulses from the background gate 124 will be counting down in each of the counters 126 and 127 during the duration of the background gate. Assume for example that three such background pulses are generated. Each of the up/down counters would then show a negative three counts. Thereafter, when the gates 121 and 123 are generating pulses from the downhole signal, each will count up three pulses, thus negating the effect of the background radiation, and any subsequent pulses from the two gates 121 and 123 will thereafter be counted. The output of the counters 126 and 127, as previously stated, pass through the count rate meters 128 and 129 and then into the signal processing circuitry 130 which may constitute merely the recording of the outputs of the two count rate meters 128 and 129 or may be used to generate sigma signals in a manner described hereinbefore.

Thus it should be appreciated that there has been described herein the preferred embodiment of the present invention wherein a vast improvement is disclosed for eliminating the effects of background radiation without seriously limiting the duty cycle of the neutron generator. Those skilled in the art will recognize, however, that modifications can be made to the disclosed embodiment without departing from the scope of the present invention. For example, as long as the number of neutron bursts is a substantial number compared to the off cycle, similar results can be achieved, assuming of course that the background gate is sufficiently long to allow the die-away of the thermal neutron population induced by the pulsed neutron radiation of the formation.

The embodiments of the invention in which an exclusive property or privilege is claimed are defined as follows:

1. Apparatus for radioactivity well logging, comprising:
   an elongated instrument adapted to traverse an earth borehole;
   a source of neutrons within said instrument;
   radiation detection means within said instrument in spaced relation to said source, said detection means including means to generate electrical signals indicative of such detected radiation;
   first, second and third gates within said instrument connected to the output of said detection means; and
   means within said instrument to repetitively pulse said neutron source and to trigger said first, second and third gates in timed relationship with the pulsing of said neutron source, said means being characterized by the gate widths of said first and second gates being substantially equal, by the gate width of said third gate being substantially wider than the widths of said first and second gates, by the first and second gates being opened after each time the neutron source is pulsed, and by the third gate being opened only after the neutron source has been pulsed a substantial number of times and then not pulsed for a plurality of cycles.

2. The apparatus according to claim 1, wherein said third gate is at least 10 times the width of either of said first and second gates.

3. The apparatus according to claim 2, wherein said neutron source is pulsed approximately 100 times before said third gate is opened.

4. The apparatus according to claim 3, including in addition thereto, means for scaling down the output of each of the first and second gates by factor of 10.

5. The apparatus according to claim 4, including in addition thereto, means for subtracting the electrical signals indicative of the detected radiation occurring during said third gate from the scaled down electrical signals indicative of the detected radiation occurring during each of said first gates following each of the 100 neutron bursts resulting from the neutron source being pulsed.

6. The apparatus according to claim 4, including in addition thereto, means for subtracting the electrical signals indicative of the detected radiation occurring during said third gate from the scaled down electrical signals indicative of the detected radiation occurring during each of said second gates following each of the 100 neutron bursts resulting from the neutron source being pulsed.

7. A method of radioactivity well logging, comprising:
   irradiating the formations surrounding an earth borehole with neutrons during a plurality of spaced irradiation cycles;
   detecting radiation occurring from said formations during first and second intervals following each of said irradiation cycles and generating electrical signals indicative of such radiation;
   discontinuing the irradiation of said formations for a plurality of cycles;
   detecting radiation occurring from said formations during a third interval subsequent to the discontinuance of said irradiation and generating electrical signals indicative of such detected radiation;
   scaling down the number of electrical signals indicative of the radiation occurring during said first and second intervals; and
   subtracting said electrical signals indicative of the radiation occurring during said third interval from said scaled down electrical signals.

8. The method according to claim 7 wherein said plurality of irradiation cycles comprises 100 cycles.

9. The method according to claim 8 wherein said irradiation is discontinued for four cycles subsequent to the 100 cycles.

10. The method according to claim 9 wherein said scaled down electrical signals are scaled down by a factor of 10.

* * * * *